March 30, 1926.
G. GRIMSRUD
1,578,282
WEED DESTROYING ATTACHMENT FOR DISK HARROWS
Filed Feb. 17, 1925    4 Sheets-Sheet 1
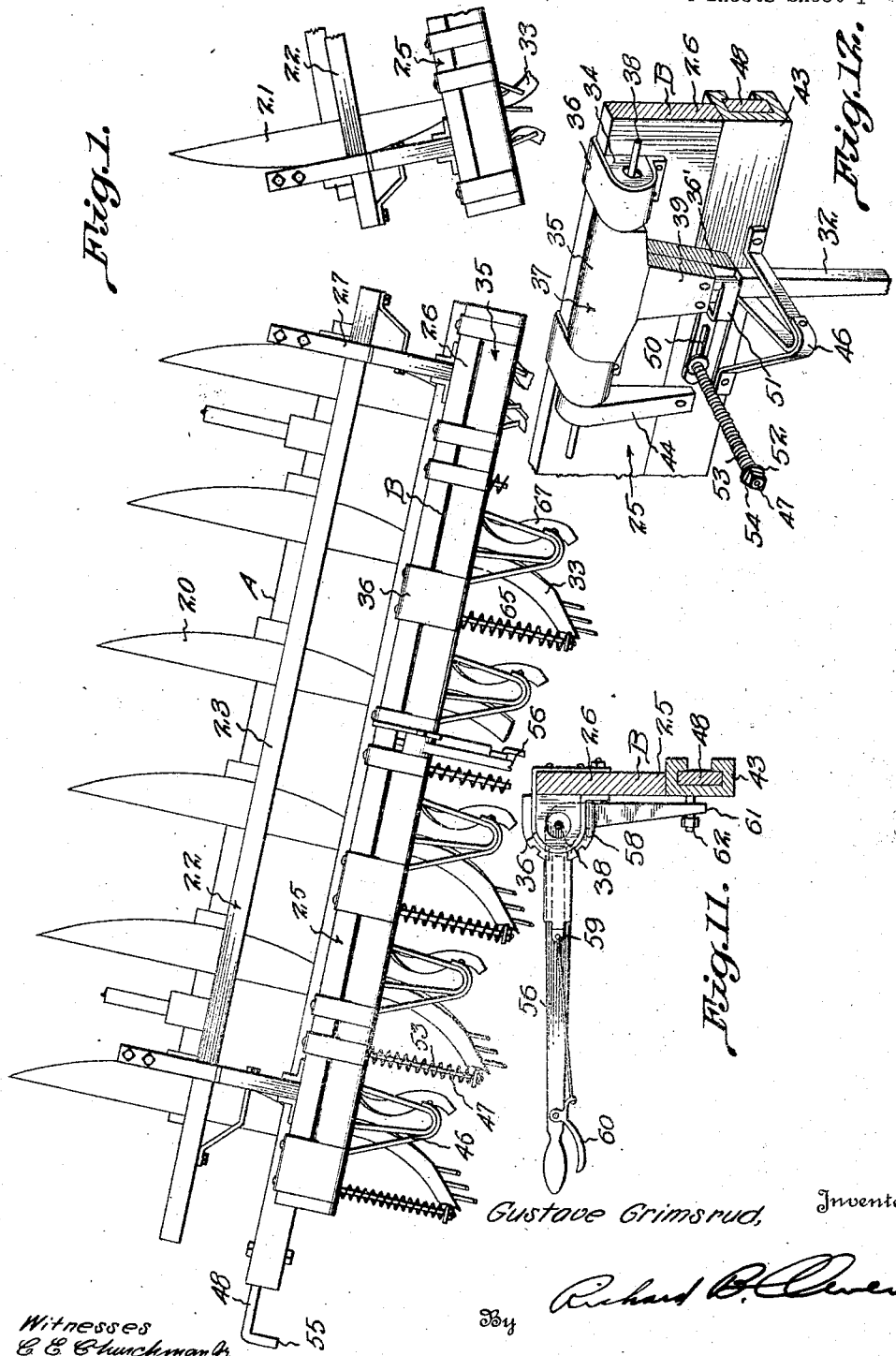
Gustave Grimsrud, Inventor
Witnesses

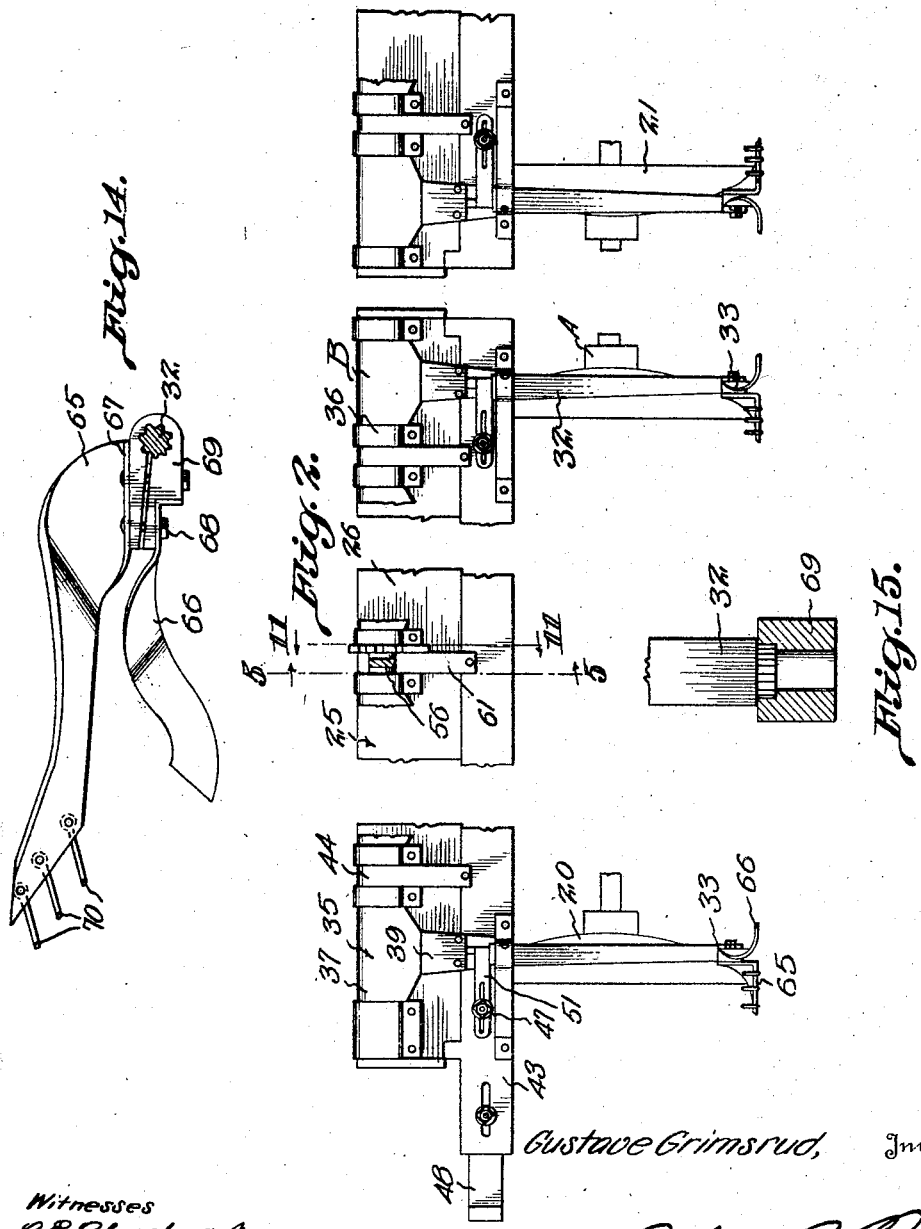

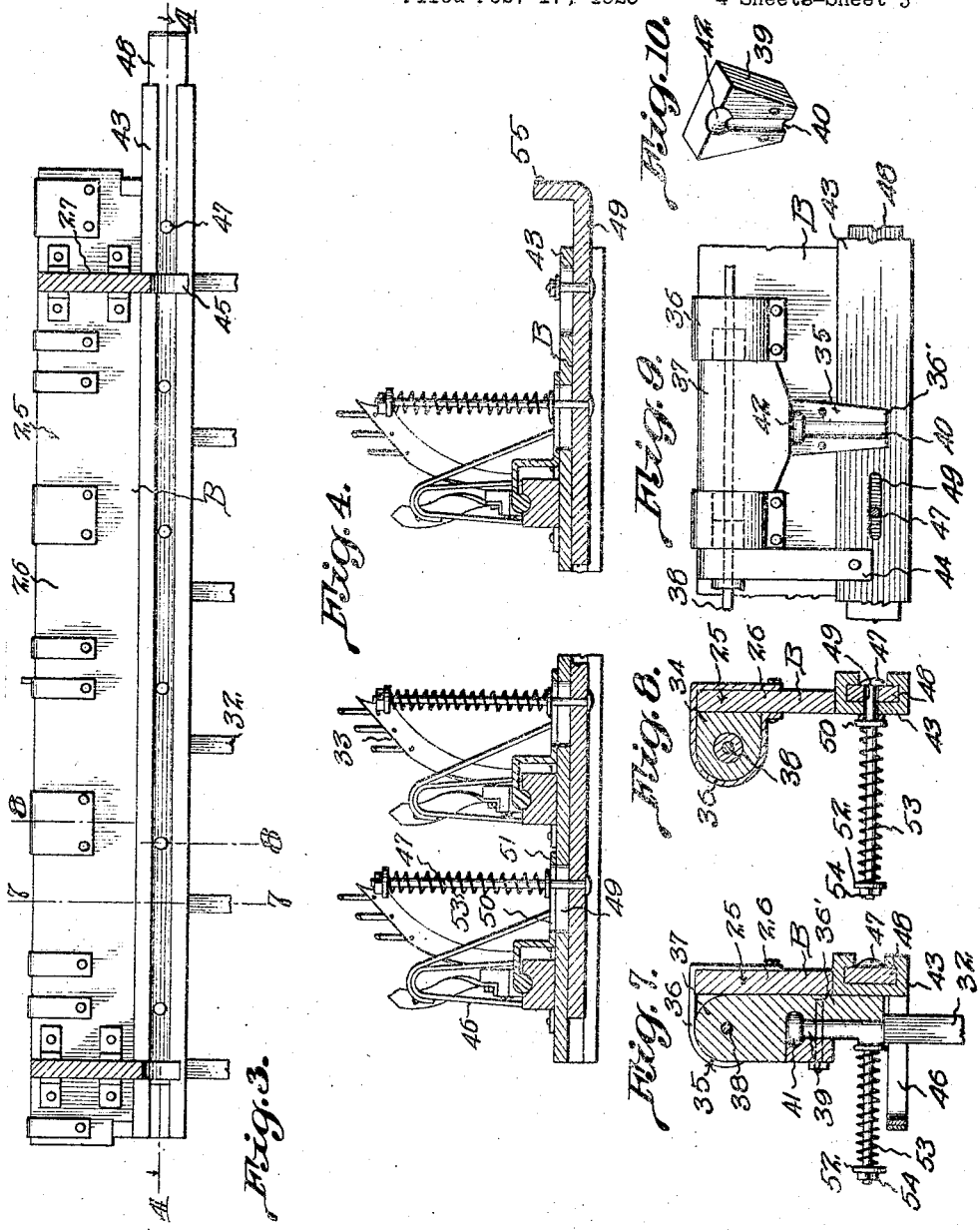

March 30, 1926. 1,578,282
G. GRIMSRUD
WEED DESTROYING ATTACHMENT FOR DISK HARROWS
Filed Feb. 17, 1925 4 Sheets-Sheet 4
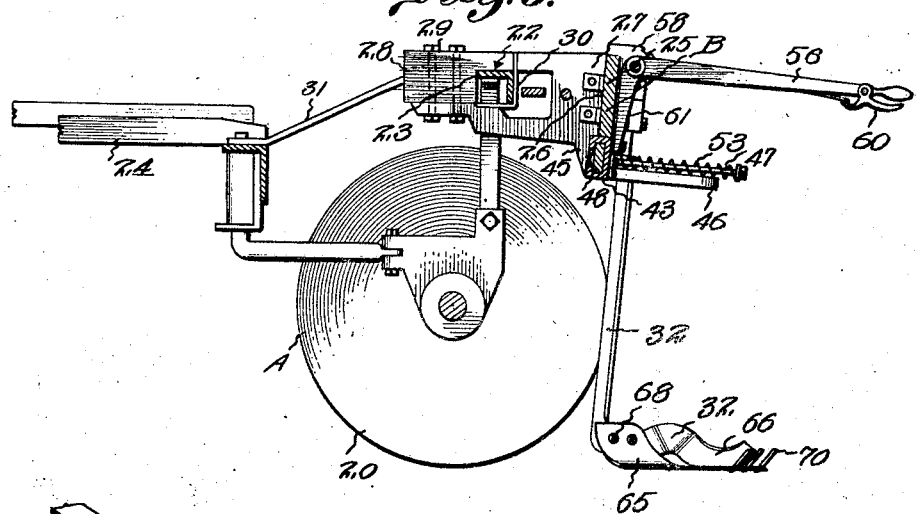
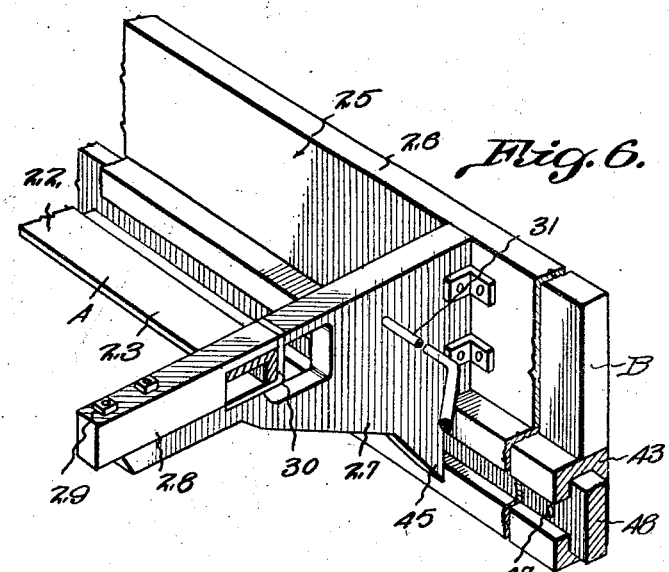
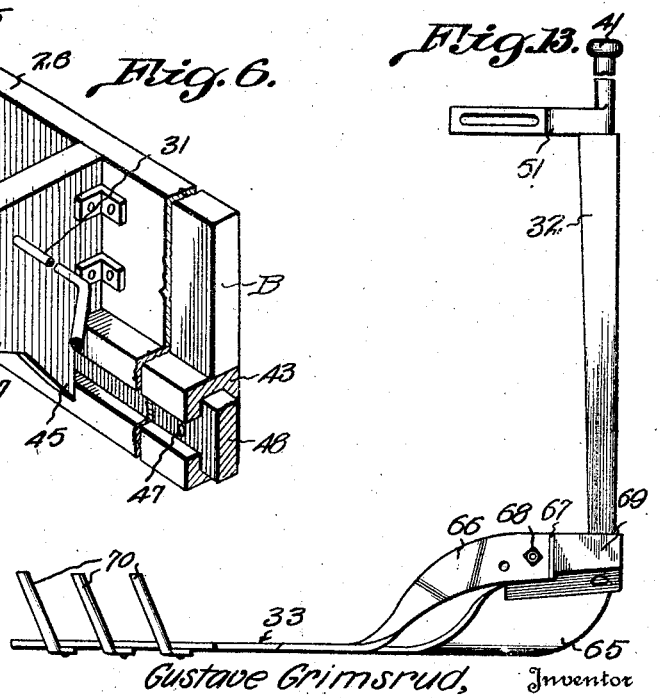
Gustave Grimsrud, Inventor Patented Mar. 30, 1926.

1,578,282

UNITED STATES PATENT OFFICE.

GUSTAVE GRIMSRUD, OF ANTELOPE, MONTANA.

WEED-DESTROYING ATTACHMENT FOR DISK HARROWS.

Application filed February 17, 1925. Serial No. 9,862.

*To all whom it may concern:*

Be it known that I, GUSTAVE GRIMSRUD, a citizen of the United States, residing at Antelope, in the county of Sheridan and State of Montana, have invented certain new and useful Improvements in Weed-Destroying Attachments for Disk Harrows, of which the following is a specification.

This invention appertains to farming implements and the primary object of the invention is to provide a novel attachment for disk harrows for effectively destroying all of the weeds in a field during the cultivation thereof.

It has been found that during the cultivation of a field with a disk harrow, that only a portion of the weeds are destroyed and that the remainder of the weeds are simply turned over by the disks and that in a course of a few days the weeds are again growing stronger than ever.

It is therefore another object of this invention to provide an attachment which can be quickly and readily associated with an ordinary type of disk cultivator which will effectively cut and uproot all of the weeds left untouched by the disks thereby assuring the killing of all of the weeds in a field being cultivated.

A further object of the invention is to provide a novel weed destroyer attachment for farming implements, embodying a plurality of cutting blades and means for moving said blades into and out of operative position relative to the disks.

A further object of the invention is to provide novel means for mounting the cutting knives of the attachment whereby the knives are permitted to give when the same strike a hard object such as a rock, thereby preventing injury to the knives and the attachment.

A further object of the invention is the provision of novel resilient means for normally holding the knives in their operative position against swinging movement unless hit by a hard object such as a rock, and novel means for adjusting said spring means relative to the standards supporting said blades.

A still further object of the invention is to provide an improved weed attachment for disk harrows of the above character, which will be durable and efficient in use, one that will be simple and easy to manufacture and one which can be incorporated with the ordinary type of disk harrow at a small cost.

With these and other objects in view, the invention consists in the novel construction, arrangement and formation of parts, as will be hereinafter more specifically described, claimed, and illustrated in the accompanying drawings, in which drawings, Figure 1 is a fragmentary top plan view of the disk harrow showing the improved weeder attachment incorporated therewith, Figure 2 is a rear fragmentary elevation of the attachment showing the same incorporated with a disk harrow, the adjusting lever for the knives being shown in section, Figure 3 is a fragmentary front view of the attachment showing parts thereof in section and illustrating the supporting frame for the standards of the knives.

Figure 4 is a horizontal section through the attachment taken on the line 4—4 of Figure 3 looking in the direction of the arrows and illustrating the novel means utilized for normally holding the knives in their operative position against swinging movement and the means for adjusting the position of said knives.

Figure 5 is a transverse section through a disk harrow with the attachment incorporated therewith taken on the line 5—5 of Figure 2 looking in the direction of the arrows, Figure 6 is an enlarged detail perspective view of the frame of the attachment, Figure 7 is a detail transverse section through the frame of the attachment taken on the line 7—7 of Figure 3 illustrating the novel means for holding the blade standards in position on the frame of the attachment, Figure 8 is a detail transverse section taken through the frame on the line 8—8 of Figure 3, Figure 9 is a fragmentary rear elevation of a portion of the frame illustrating the position of one of the companion clamp members for receiving one of the standards, Figure 10 is a detail perspective view of the companion block for holding one of the knife standards in place, Figure 11 is a detail transverse section taken through the frame of the attachment on the line 11—11 of Figure 2 looking in the direction of the arrows and illustrating the construction of the frame and means for simultaneously adjusting the knives toward and away from the cultivator, Figure 12 is a detail perspective view of a portion of the attachment illustrating the construction of the frame and the arrangement of one of the standards on the frame, Figure 13 is a detail view of one of the cutting knives and supporting standards, Figure 14 is a fragmentary top plan view of one of the cutting knives showing its supporting standard in horizontal section, Figure 15 is a detail section through the lower end of one of the supporting standards.

Referring to the drawings in detail wherein similar reference characters designate corresponding parts throughout the several views the letter A generally indicates a disk harrow and B the improved weeder attachment therefor.

The disk harrow A is of the conventional type and will not be described in detail, but as shown the same includes the usual gangs 20 and 21 of disks and the frame 22, which as shown includes the transversely extending angle bars 23.

Arranged in front of the disks 20 and 21 is any preferred type of draft appliance 24 which is connected with the frame in any desired way.

The improved weeder attachment B includes a pair of frames 25 one of which is adapted to be associated with each gang of disks. As these frames are constructed identically the same only one will be described in detail. Each frame 25 consists of a flat longitudinally extending plate 26 which is arranged in rear of the angle bar 23 in substantially parallel relation thereto. This plate 26 has rigidly secured thereto in any desired way forwardly extending supporting arms 27 which are adapted to receive the said angle bar 23. Clamping blocks 28 are bolted as at 29 to the arms and engage the upper surface of the front edge of the angle bar and if so desired clips 30 can be clamped between the blocks 28 and the arms 27 for engaging the rear face of the said angle bar.

In order to further hold the frame rigidly on the frame of the harrow, the arms 27 are provided with forwardly extending inclined brace rods 31 which are bolted to the draft appliance 24 of the said harrow.

The flat board or plate 26 forms the means for supporting the standards 32 for the weeder knives 33 and it can be seen by referring to Figures 1 and 2 of the drawings that a standard and cutter is provided for each harrow disk.

The rear face of the board or plate 26 has secured thereto at spaced points a plurality of pairs of bearing blocks 34 which are held in place by suitable straps 36. These bearing blocks 34 receive between the same sectional clamping members 35 for holding the said standards 32. Each sectional clamping member 35 is so constructed, as will be hereinafter more fully described, to permit the swinging movement of the standards so that the knife carried thereby will be permitted to swing out of engagement with a hard object such as a rock to prevent injury to the knife during use of the implement.

Each clamping member 35 includes a main clamping block 36′ having a hinge barrel 37 formed thereon. The hinge barrel 37 is disposed between the bearing blocks 34 and a suitable hinge rod 38 is passed through all of the bearing blocks 34 and all of the hinge barrels 37 of the clamping members. A companion clamping block 39 is provided for each main clamping block 36′ and the inner faces of the blocks are provided with mating recesses 40 for receiving the upper ends of the standards 32. The upper end of each standard is provided with a ball head 41 which is fitted in companion sockets formed in the inner faces of the said blocks 36′ and 39. It is obvious by this construction that the standards will be held firmly in place and yet be permitted to rotate so that the cutting knives can swing out of engagement with a hard object.

In order to permit the simultaneous adjustment of all of the knives into and out of operative position relative to the harrow disks a guide bar 43 is associated with the lower edge of the main supporting plate or board 26. As clearly shown in Figures 5, 6 and 12 of the drawing, this guide bar is disposed in parallel relation to the board or plate 26 and is connected thereto for swinging movement by means of hinges 44. The supporting arms 27 of the frame 25 of the harrow attachment B is provided with depending lugs 45 which engage the inner face of the guide bar 43 and these lugs prevent the forward swinging of the said guide bar but permit the rearward swinging thereof.

Rearwardly projecting guide straps 46 are securely bolted to the guide bar 43 and these guide straps receive the standards 32 and form guide tracks therefor during the swinging movement of the said guide bar 43 for adjusting the blades into and out of their operative position.

In order to normally hold the standards and the knives in their operative position relative to the harrow disks and to normally prevent swinging movement of the standards incident to the general use of the implement, bolts 47 are carried by a slide strap 48 which is slidably mounted in the guide bar 43. By referring to Figures 5 and 6 of the drawing it can be seen that the guide bar 43 is of a channel beam construction and that the slide strap is fitted in the channel formed by each channel beam. These bolts 47 slidably extend through slots 49 and 50 formed respectively in the guide bar 43 formed on the standards 32 adjacent to the upper ends thereof. Suitable washers 52 are mounted on each of the bolts 47 and expansion springs 53 are coiled about the said bolts between the washers. The tension of the springs can be adjusted by nuts 54 threaded on the bolts. As shown the innermost washers mounted on the bolts 47 engage the outer faces of the arms 51 and thus these springs perform the dual function of normally preventing rotation of the standards and for normally holding the standards in their operative position relative to the said harrow disks.

The outer end of the guide strap 48 is provided with a manipulating handle 55 for permitting the convenient sliding of this strap and it is obvious that by sliding the strap, the expansion springs 53 can be moved toward and away from the standards 32.

In order to permit the simultaneous adjustment of all of the blades 33 into operative or into inoperative position relative to the harrow disks an operating lever 56 is pivotally mounted on the rod 38 adjacent to a sector rack 58 which is bolted or otherwise secured to the said main supporting plate or board 26. The lever 56 is held in any preferred adjustable position by a pawl 59 which engages the teeth of the sector rack 58 and this pawl can be actuated by a rod and pivoted hand grip 60. The inner end of the lever 56 is provided with a right angularly shaped foot 61 which engages the guide bar 43 and the foot is connected to the said guide bar 43 by use of a suitable nut and bolt 62.

The knives 33 are of a novel construction and now will be described.

Each cutting knife 33 is arranged at an angle to its harrow disk adjacent to the lower end thereof and includes a relatively large arcuate blade 65 and a relatively small diverging blade 66. The inner end of each blade is provided with a right angularly disposed shank 67 which is connected by means of bolts 68 with an attaching block 69. The attaching block 69 receives the lower end of the standard 32 which is provided with teeth for fitting in the block for preventing turning movement of the blades relative thereto. A plurality of fingers 70 are carried by the blades 65 to throw the weeds to one side of the blades when the same are in use.

In use of the improved device, after the disk harrow has been driven to the field to be cultivated, the lever 56 is operated so as to permit the guide bar 43 to be swung into parallel relation to the plate 26. All of the knives will now be in operative position relative to the disks. As the disks cultivate the field the knives in rear thereof will engage the weeds and effectively uproot the weeds and kill the same. If one of the knives should come in contact with a hard object such as a rock or the like the knife is permitted to swing rearwardly against the tension of the spring 53 but as soon as the rock is passed the knife will be brought back to its former position by the said spring.

When the cultivator is being moved to and fro from the field it is merely necessary to pull up on the lever 56 which will swing the guide bar 43 rearwardly carrying the knives from out of their operative position relative to the disk.

By the foregoing description, it can be seen that I have provided a novel attachment for disk cultivators which will effectively kill all of the weeds in a field incident to the travel of the harrow thereover.

Changes as in details may be made without departing from the spirit or the scope of this invention, but:—

What I claim as new is:—

1. A weeder attachment for farming implements comprising a supporting frame including a plate, a plurality of pivoted clamps carried by the plate, standards rotatably mounted in the clamps, weeding knives carried by the lower ends of the standards, a swinging guide bar connected with the plate engaging the standards, a radially extending arm connected with each standard, a bolt extending through the arm carried by the guide plate, spring means coiled about the bolts engaging the arms, and means for simultaneously sliding the bolts on said arms toward and away from the standards.

2. A weeder attachment for farming implements comprising a supporting frame, standards rotatably carried by the frame, weeding knives connected with the lower ends of the standards, a radially extending arm connected with each standard, a bolt extending through each arm, spring means coiled about each bolt for engaging the arm for normally holding the standards in a predetermined position, and means for simultaneously adjusting the bolts on said arms toward and away from said standards.

3. The combination with a disk harrow including a plurality of harrow disks, of a frame connected with the harrow including a rearwardly extending guide bar, a cutting knife for each harrow disk arranged at an angle thereto, a standard for each knife, means pivotally connecting each standard to the frame, guides carried by the swinging guide bar for the standards, and resilient means normally holding the standards against swinging movement and the guide bar against swinging movement.

4. The combination with a disk harrow including a plurality of harrow disks, of a frame connected with the harrow including a rearwardly extending guide bar, a cutting knife for each harrow disk arranged at an angle thereto, a standard for each knife, means pivotally connecting each standard to the frame, guides carried by the swinging guide bar for the standards, and resilient means normally holding the standards against swinging movement and the guide bar against swinging movement and means for adjusting said guide bar against the tension of the spring for permitting the simultaneous adjustment of the knives.

5. The combination of a weeder attachment for the harrow comprising a frame disposed above the harrow disk including a flat plate depending standards pivoted to the plate, weed cutting knives arranged at an angle to the disks connected with the standards, a guide bar hingedly connected with the plate and arranged to engage all of the standards, means engaging the guide bar to limit the swinging movement thereof in one direction, angularly extending slotted arms carried by the standards, bolts carried by the guide bar extending through the slotted arms, expansion springs coiled about said bolts normally holding the arms against swinging movement and the bar against swinging movement.

6. The combination with a disk harrow of a weeder attachment therefor comprising a frame connected with the harrow, including a plate arranged longitudinally of the harrow a plurality of standards depending from the plate and pivotally connected to the plate at its upper ends, weed cutting knives carried by the lower ends of the standards, a channel shaped guide bar hingedly connected to the plate, a guide strap slidably mounted in the channel guide bar, a plurality of bolts carried by the guide straps extending through slots formed in said guide bar, angularly extending slotted arms formed on the standards receiving said bolts, expansion springs coiled about the bolts engaging said slotted arms, means for sliding the slide strap and means for swinging said channel bars relative to the disks.

7. A weeder attachment for farming implements comprising a supporting frame including a plate a plurality of hinged clamps carried by the plate, each clamp consisting of companion blocks, standards rotatably mounted in the blocks, weeding knives carried by the lower ends of the standards, a swinging guide bar connected with the plate engaging one of the standards, a radially extending arm connected with each standard, a bolt extending through each arm carried by the guide plate, spring means coiled about the bolt engaging the arm, and a lever pivotally connected with the plate engaging said bar.

In testimony whereof I affix my signature.

GUSTAVE GRIMSRUD.